US008875567B2

(12) United States Patent
Robertson et al.

(10) Patent No.: US 8,875,567 B2
(45) Date of Patent: Nov. 4, 2014

(54) MEASUREMENT OF DIESEL ENGINE EMISSIONS

(75) Inventors: Douglas A. Robertson, Houston, TX (US); Nearamit Sananikone, Houston, TX (US); Mauro Tagomori, Houston, TX (US)

(73) Assignee: Transocean Sedco Forex Ventures Limited, George Town, Grand Cayman (KY)

( * ) Notice: Subject to any disclaimer, the term of this patent is extended or adjusted under 35 U.S.C. 154(b) by 16 days.

(21) Appl. No.: 13/571,742

(22) Filed: Aug. 10, 2012

(65) Prior Publication Data

US 2013/0199282 A1 Aug. 8, 2013

Related U.S. Application Data

(60) Provisional application No. 61/524,053, filed on Aug. 16, 2011.

(51) Int. Cl.
*G01M 15/10* (2006.01)
*F02D 41/14* (2006.01)
*F01N 11/00* (2006.01)

(52) U.S. Cl.
CPC ......... *G01M 15/102* (2013.01); *F02D 41/1445* (2013.01); *F01N 11/005* (2013.01); *F01N 11/00* (2013.01); *F02D 41/1462* (2013.01); *Y02T 10/47* (2013.01)
USPC ...................................... 73/114.71

(58) Field of Classification Search
USPC ............... 73/114.71, 114.69, 114.72, 114.73, 73/114.75
See application file for complete search history.

(56) References Cited

U.S. PATENT DOCUMENTS

| 5,014,670 | A | 5/1991 | Mitsumoto |
| 5,159,810 | A | 11/1992 | Grutter et al. |
| 5,639,957 | A * | 6/1997 | Zarchy .................. 73/23.31 |
| 6,378,296 | B1 | 4/2002 | Yasui et al. |
| 6,721,649 | B2 | 4/2004 | Knott et al. |
| 7,010,907 | B2 | 3/2006 | Matsubayashi et al. |
| 7,155,332 | B2 * | 12/2006 | Yamada et al. ............... 701/108 |
| 2004/0168431 | A1 | 9/2004 | Goralski et al. |
| 2004/0187483 | A1 | 9/2004 | Dalla Betta et al. |
| 2008/0010973 | A1 | 1/2008 | Gimbres |
| 2010/0005872 | A1 * | 1/2010 | Vennettilli et al. ......... 73/114.73 |
| 2010/0050614 | A1 | 3/2010 | Parmentier et al. |
| 2010/0242457 | A1 * | 9/2010 | Konstandopoulos et al. .. 60/311 |

OTHER PUBLICATIONS

International Search Report mailed Nov. 2, 2012 during prosecution of International Application No. PCT/US2012/050292.

(Continued)

*Primary Examiner* — Eric S McCall
(74) *Attorney, Agent, or Firm* — Fulbright & Jaworski LLP (57) ABSTRACT

An emissions output of an engine, such as a diesel generator, may be determined from the load on the engine and an exhaust volume from the engine. Chemicals such as nitrogen oxide ($NO_x$) may be calculated for a measured load on the engine. The calculation may include determining an air flow in the engine from air pressure measurements and turbo compressor speed measurements. The calculation may also include determining a gas flow into the engine by deriving fuel flow from known test results. The calculated emissions output may be used to ensure compliance of an engine with environmental regulations. A remote monitoring program may generate alerts when the engine fails to comply with environmental regulations.

19 Claims, 7 Drawing Sheets

(56) References Cited

OTHER PUBLICATIONS

Revised Nox Technical Code, "Technical Code on Control of Emission of Nitrogen Oxides from Marine Diesel Engines", 2008, MEPC 58/WP.9, Annex 2, pp. 3-100.

International Standard, "Reciprocating internal combustion engines—Exhaust emission measurement—Part 1: Test-bed measurement of gaseous and particulate exhaust emissions", ISO 8178-1, Second Edition, Sep. 15, 2006.

* cited by examiner

Transocean  Discoverer Spirit

Tag number: ELPG EMG 001
Tag description: Main Engine #1A

| Maintenance Plan | Maintenance History | Manufacturer | Specifications | Alarm History | Location Points | Maintenance Procedures | More... |

[View History]          Save    Cancel    Exit

Checks & Measurements — 608

Checks & Measurements

| Checks/Measurements | Valid Range [Low/High] | Alarms [Low/High] | Critical | Units | Remarks |
|---|---|---|---|---|---|
| Cyl Temp High | Undefined/Undefined | Undefined/Undefined | Routine | Deg C | |
| Cyl Temp Low | Undefined/Undefined | Undefined/Undefined | Routine | Deg C | |
| Eng Lube oil added | Undefined/Undefined | Undefined/Undefined | Routine | gals | |
| Eng Load | Undefined/Undefined | Undefined/Undefined | Routine | KW | |
| Generator | Undefined/Undefined | Undefined/Undefined | Routine | A | |
| Freq | Undefined/Undefined | Undefined/Undefined | Routine | Hz | |
| Gen Bearing Temp DE | Undefined/Undefined | Undefined/Undefined | Routine | Deg C | |
| Gen Bearing Temp NDE | Undefined/Undefined | Undefined/Undefined | Routine | Deg C | |
| Alt Cooler Temp In | Undefined/Undefined | Undefined/Undefined | Routine | Deg C | |
| Alt Cooler Temp Out | 5/30 | 5/14,5 | Routine | Deg C | |
| NOx Concentration | | | Measurement | g/kWHr | For ERA Emissions Acc |

— 610

Maintain tag checks & measurements | H2-HDCSQL5VS004\SQL064 - 4.0.0 | Dougie Roberton | 7/19/2010 | 09/27

MEASUREMENT OF DIESEL ENGINE EMISSIONS

CROSS-REFERENCE TO RELATED APPLICATIONS

This application claims priority to U.S. Provisional Appl. No. 61/524,053 to Douglas Robertson et al. entitled "Measurement of Diesel Engine Emissions" and filed on Aug. 16, 2011, which is hereby incorporated by reference.

TECHNICAL FIELD

This application is related to environmental testing. More specifically, this application is related to exhaust testing of marine diesel engines.

BACKGROUND

Engines generally generate power by combusting a fuel. Chemical reactions taking place during combustion in the engine creates exhaust having multiple chemical compounds, in addition to generation of the power. The chemical compounds are exhausted from the engine into the environment. However, local governing bodies often regulate the exhaust of chemical compounds into the environment. For example, in the United States the Environmental Protection Agency (EPA) may regulate the release of certain chemicals into the environment.

Diesel engines generate nitrogen oxide ($NO_x$) during combustion, which is released through an exhaust system of the diesel engine. $NO_x$ is monitored by the EPA, which places limits on the amount of $NO_x$ that may be exhausted into the environment. However, $NO_x$ is only one of several chemicals produced by engines, whether diesel or other, that is monitored and restricted. The amount of exhaust and chemicals released by an engine varies with the operating conditions of the engine. For example, the exhaust generated by an engine may vary with respect to the load placed on the engine.

Figure 1:
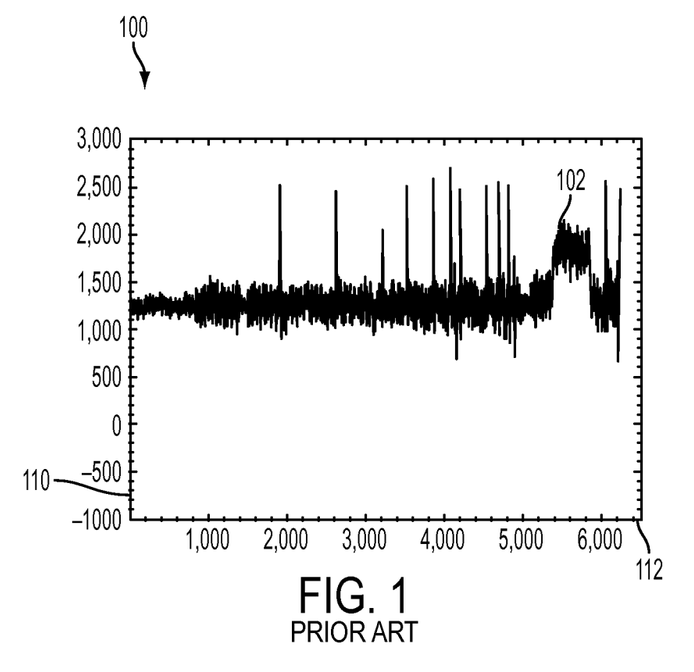
FIG. 1 is a graph illustrating a load on a generator of a drilling rig rapidly changing over time.

Diesel engines are frequently used as power generators when connection to an electricity grid is unavailable or not functioning. For example, diesel generators may be used on ships and offshore platforms to generate power for ship-board and on-platform electrical devices. However, when used as a power generator, diesel engines may be subject to variable loads. FIG. 1 is a graph illustrating a load on a generator of a drilling rig rapidly changing over time. A line 102 of a graph 100 illustrates a load of a generator in kilowatts on a y-axis 110 versus time in seconds on an x-axis 112. When the load on the diesel engine rapidly changes, the exhaust generated by the diesel engine will also rapidly change.

BRIEF SUMMARY

According to one embodiment, a method includes determining a load of an engine. The method also includes determining an exhaust volume of the engine. The method further includes calculating a quantity of a chemical emitted from the engine based, in part, on the load, the exhaust volume, and a density of the chemical.

According to another embodiment, a computer program product includes a non-transitory computer-readable medium having code to determine a load of an engine. The medium also includes code to determine an exhaust volume of the engine. The medium further includes code to calculate a quantity of a chemical emitted from the engine based, in part, on the load, the exhaust volume, and a density of the chemical.

According to yet another embodiment, an apparatus includes a power meter coupled to an output of an engine. The apparatus also includes an engine monitor coupled to the engine. The apparatus further includes a memory. The apparatus also includes a processor coupled to the power meter and coupled to engine monitor and coupled to the memory. The processor is configured to determine a load of an engine from the power meter. The processor is also configured to determine an exhaust volume of the engine from the engine monitor. The processor is further configured to calculate a quantity of a chemical emitted from the engine based, in part, on the load, the exhaust volume, and a density of the chemical.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present invention, reference is now made to the following descriptions taken in conjunction with the accompanying drawings.

FIG. 6 is a screen shot of a computer program for recording emissions of an engine according to one embodiment of the disclosure.

DETAILED DESCRIPTION

Emissions for an engine, such as a diesel engine, may be determined by measuring parameters obtained from the engine and/or other components and using those parameters to calculate a quantity of emissions. The quantity may be, for example, a value in grams per kilowatt-hour output generated by the engine. Quantities of different chemicals emitted by the engine may be determined from the density of the chemical of interest, engine load, exhaust volume, and/or other parameters. In one embodiment, nitrogen oxide ($NO_x$) emission quantities are determined from the load on the engine and the exhaust volume emitted from the engine.

Figure 2:
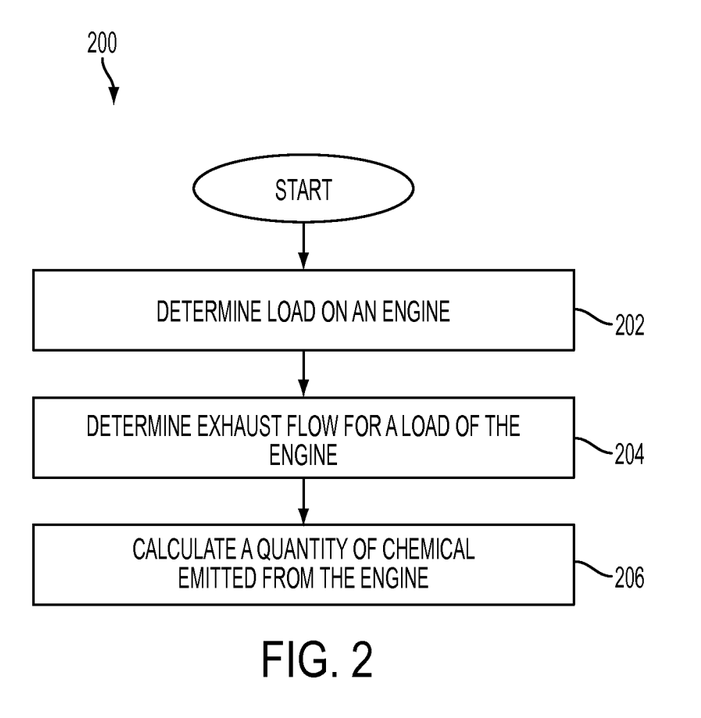
FIG. 2 is a flow chart illustrating a method for calculating the emissions of an engine according to one embodiment of the disclosure.

FIG. 2 is a flow chart illustrating a method for calculating the emissions of an engine according to one embodiment of the disclosure. A method 200 begins at block 202 with determining a load of an engine. According to one embodiment, the engine shaft load may be calculated from an electrical switchboard load. According to another embodiment, the engine total load is the engine shaft load.

The method 200 continues to block 204 with determining an exhaust volume from the engine. The exhaust volume may be determined from one or more components such as, for example, the sum of fuel flow and air flow.

Figure 3:
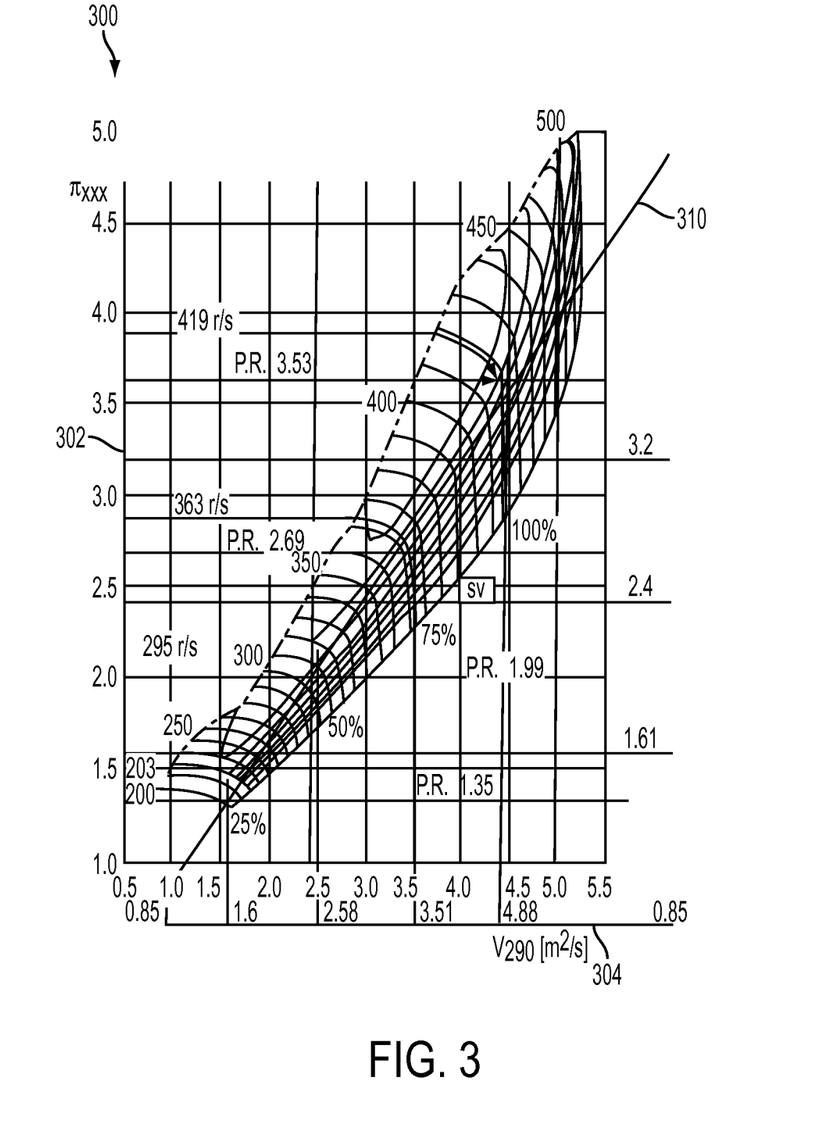
FIG. 3 is a compressor map for the turbocharger of an engine according to one embodiment of the disclosure.

According to one embodiment, air flow may be determined from a compressor map based, in part, on engine charge air pressure and verified with turbo compressor speed. The air pressure and the turbo compressor speed may be measured by an engine monitor sensor and reported to a processor. The processor may be configured to access a compressor map stored in memory. The memory may include a number of compressor maps, each compressor map appropriate for a certain engine. FIG. 3 is a compressor map for a turbocharger according to one embodiment of the disclosure. A graph 300 may include an x-axis 304 having increasing air pressure values. The graph 300 may also include a y-axis 302 having increasing turbo compressor rotation valves. A line 310 of the graph 300 may connect air pressure ratios on the y-axis 302 with turbo compressor air flow in $m^3/s$ on the x-axis 304.

Fuel flow may be determined based on the engine test bed results giving the fuel consumption in g/kW*hr and the measured load of the engine. For example, under higher loads the engine consumes additional fuel. According to one embodiment, for engines with a high ratio (e.g., 25:1 to 75:1) of air flow to fuel flow, a look-up table of fuel flows for different engine loads may be stored in memory and referenced. Because the ratio of air flow to fuel flow is very high and the amount of fuel flow is low compared to air flow, errors in fuel flow quantities do not introduce large errors to the calculation of exhaust volume. Thus, look-up values, even though based on estimates instead of actual measurements, may be used in determining the fuel flow without adding large error to exhaust volume determinations. According to another embodiment, engines with a lower ratio of air flow to fuel flow may have engine monitors for measuring the fuel flow, either continuously or at specified intervals.

Referring back to FIG. 2, the method 200 then continues to block 206 with calculating a quantity of a chemical emitted from the engine based, in part, on the load, the exhaust volume, and a density of the chemical. The quantity calculated may be determined from the equation $$Q = \rho/L * V_E,$$

where Q is the quantity in grams per kilowatt hour, p is the density of the chemical of interest, L is the load on the engine, and $V_E$ is the exhaust volume generated by the engine. The density, $\rho$, may be calculated as $$\rho = ppm * k * MW/T,$$

where ppm is the parts per million concentration for the chemical, k is the proportionality constant, MW is the molecular weight of the chemical, and T is a temperature of the exhaust. According to one embodiment, the emission quantity of nitrogen oxide ($NO_x$) may be calculated by setting MW=46.01 and k=12.187.

The method 200 of FIG. 2 may be performed continuously for an engine to calculate continuous emissions from the engine. According to another embodiment, the method 200 may be performed at discrete time intervals, defining a sampling rate. The sampling rate may be selected at a rate sufficient to capture changes in the engine load. For example, if engine load is rapidly changing, then the sampling rate may be higher than when the engine load is relatively constant. According to one embodiment, the sampling rate may be twice per minute, or one measurement every 30 second.

Figure 4:
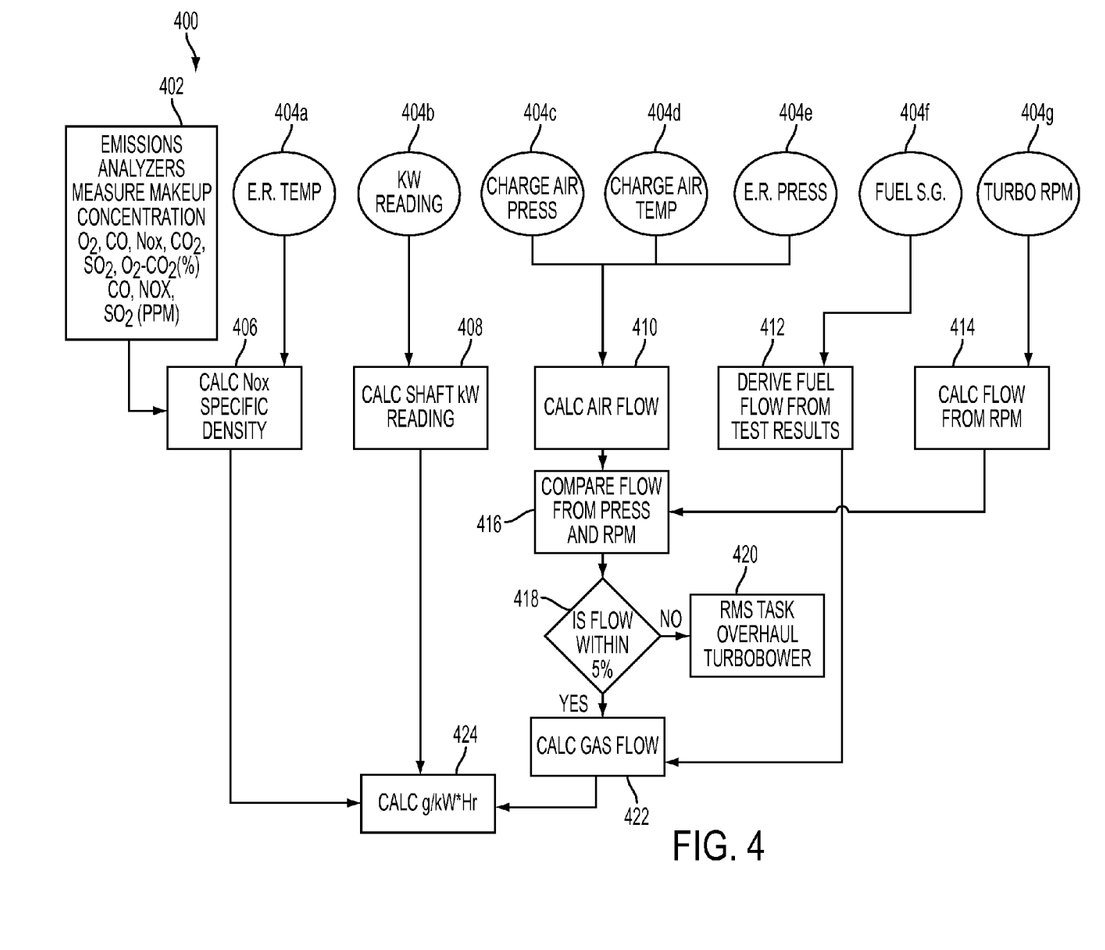
FIG. 4 is a flow chart illustrating a method for obtaining values for calculating the emissions of an engine according to one embodiment of the disclosure.

FIG. 4 is a flow chart illustrating a method 400 for obtaining values for calculating the emissions of an engine according to one embodiment of the disclosure. A specific density for a chemical, such as nitrogen oxide ($NO_x$), is computed at block 406 after receiving an emissions concentration for the chemical from block 402 and an engine room or air inlet temperature from block 404a. The specific density determined at block 406 is relayed to block 424 for use in calculating a quantity of emissions of the chemical.

At block 408, a shaft kW reading is calculated after receiving a kilowatt (KW) reading from block 404b. Block 404b may receive a kW reading from, for example, an electrical switchboard or a measurement at the engine shaft. The kW reading is relayed to block 424 for use in calculating a quantity of emissions of the chemical.

At block 410, an air flow value is calculated after receiving an air pressure from block 404c, an air temperature from block 404d, and an E.R. pressure from block 404e. At block 414 an air flow is calculated from a turbo compressor speed received from block 404g. The air flow calculation of block 410 is compared to the air flow calculation of block 414 at block 416. At block 418, it is determined whether the calculation of block 410 and/or the calculation of block 414 are within a certain range. For example, block 418 may test if the calculations are within five percent of each other. If the calculations are outside of the range in block 418 then an overhaul of the turbo compressor may be performed at block 420. After the overhaul the calculations may be performed again. If the calculations are within the range at block 418 then a gas flow is calculated from the air flow at block 422.

The gas flow calculation at block 422 may be based, in part, on the air flow calculated at block 410 and/or block 414. The gas flow calculation at block 422 may also be based, in part, on a fuel flow value calculated at block 412. According to one embodiment, the fuel flow calculated at block 412 may be derived from fuel flow test results received at block 404f. As described above, when the ratio of air flow to fuel flow is high, error introduced by deriving fuel flow from test results may not have a large impact on error in the calculation of emissions from the engine.

At block 424, emissions quantities may be calculated based, in part, on values received from the specific density calculation at block 406, the shaft reading calculated at block 408, and the gas flow calculated at block 422. According to one embodiment, the calculation may be performed according to the equation $$Q = P/L * V_E,$$

as described above with reference to FIG. 2. The resulting value may be a quantity in units of grams per kilowatt-hour.

Figure 5:
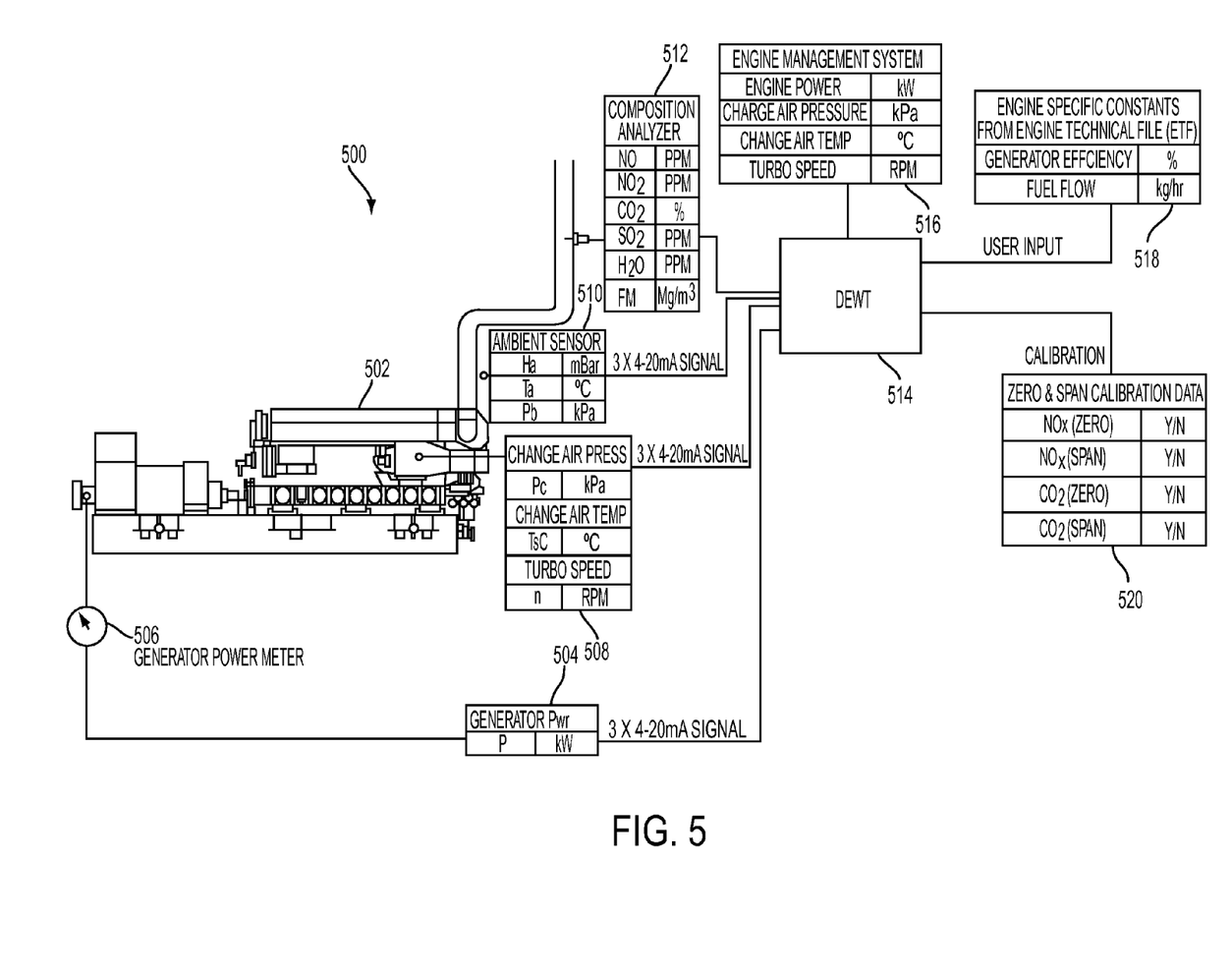
FIG. 5 is a block diagram illustrating an apparatus for calculating the emissions of an engine according to one embodiment of the disclosure.

FIG. 5 is a block diagram illustrating an apparatus for calculating the emissions of an engine according to one embodiment of the disclosure. A system 500 includes an engine 502 and includes a processor 514 for determining a quantity of emissions from the engine 502. The processor 514 may be coupled to an engine monitor 508 for receiving air pressure, air temperature, and/or turbo compressor speed values. The engine monitor 508 may include a number of sensors, or be coupled to a number of sensors within the engine 502, such as a manometer and/or a thermometer. According to one embodiment, the processor 514 may be coupled to the engine monitor 508 through three separate signal lines. According to another embodiment, the processor 514 may be coupled to the engine monitor 508 through a communication bus such as, for example, an RS-232 bus or an Ethernet bus. Although only one engine 502 is illustrated in FIG. 5, a system, such as on a drilling rig, may include more than one engine 502 coupled in series or parallel.

The processor 514 may also be coupled to an ambient sensor 510 near or located in the engine 502. The ambient sensor 510 may include sensors for determining an ambient temperature, an ambient air pressure, and/or relative humidity.

The processor 514 may further be coupled to a composition analyzer 512. The composition analyzer may be located in an exhaust system coupled to the engine 502 or located near a vent of the exhaust system for the engine 502. The composition analyzer 512 may include one or more sensors for detecting composition of the exhaust. For example, the composition analyzer 512 may include sensors for detecting concentration of nitrogen oxide (NO and/or $NO_2$), carbon monoxide and carbon dioxide (CO and/or $CO_2$), sulfur oxide (SO and/or $SO_2$), water ($H_2O$), and/or particulate matter.

The processor 514 may also be coupled to an engine management system 516. The engine management system 516 may determine and log parameters related to the operation of the engine 502. For example, the engine management system 516 may monitor engine power, air pressure, air temperature, and/or turbo compressor speed.

The processor 514 may further be coupled to a power monitor 504. The power monitor 504 may be coupled to a power meter 506, such as a wattmeter, a voltmeter, and/or an ammeter, which is coupled to an output of the engine 502. According to one embodiment, the power monitor 504 may be an electrical switchboard, or the power monitor 504 may be coupled to an electrical switchboard including a meter 506.

The processor 514 may also be coupled to memory having a table 518 storing user input values for use in determining emissions quantities from the engine 502. For example, the table 518 may include generator efficiency and/or fuel flow. Values for the table 518 may be stored by a user in a database stored in memory (not shown) coupled to the processor 514. The user may input the values through an input device such as a touchpad, keyboard, and/or mouse. According to one embodiment, the values for the table 518 may be set by a user through a network connection, such as an Internet connection.

The processor 514 may further be coupled to a calibration table 520. The calibration table 520 may store zero values and/or span values for calibrating calculations performed by the processor 514 and/or calibrating measurements received from the engine monitor 508, the composition analyzer 512, the ambient sensor 510, and/or the power monitor 504. According to one embodiment, the table 520 may include zero values and span values for each chemical of the exhaust being monitored. For example, the table 520 may include a zero value and a span value for nitrogen oxide, and a zero value and a span value for carbon dioxide.

The processor 514 and one or more of the blocks 504, 508, 510, 512, 516, 518, and 520 may be incorporated into an apparatus for monitoring exhaust from an engine. The apparatus may be implemented alongside one or more engines to monitor emissions in exhaust from the engines for monitoring or reporting for regulatory purposes.

The emissions calculations performed by the processor 514 may be monitored remotely. A remote monitoring program may receive the emissions calculations from the processor 514 and other values received by the processor 514 from blocks 504, 508, 510, 512, 516, 518, and 520. FIG. 6 is a screen shot of a computer program for monitoring and/or recording emissions of an engine according to one embodiment of the disclosure. A window 600 may allow for viewing of data, such as emissions values and operating parameters of an engine. For example, the window 600 may include displays for maintenance plans, maintenance history, alarm history, isolation points, tags, manufacturer information, specifications, maintenance procedures, and/or checks and measures. A checks and measures tab 608 may be selected to display data regarding at least one engine in the window 600. After selecting the tab 608, an emissions value for one or more chemicals may be displayed. For example, a line 610 of the window 600 displays $NO_x$ concentration determined for an engine. The line 610 may display data received from a processor, such as the processor 514 of FIG. 5, which may be calculated according to the method 200 of FIG. 2.

According to one embodiment, alarms may be set through the remote monitoring program of the window 600 to alert engineers to potential problems with an engine. For example, an alarm may be set when the $NO_x$ concentration falls below 5 g/kW-hr or exceeds 14.5 g/kW-hr. The alarm range may be selected based, in part, on regulatory laws. For example, the alarm values may be set narrower than the emissions allowed by environmental regulations such that an engineer is alerted to an emissions problem before environmental regulations are broken, which may result in fines against the operator of the engine. When the determined $NO_x$ concentration is above or below the alarm set points, an alarm message is generated and transmitted to an engineer. The alarm message may be a text message, a pager notification, an electronic message, a siren, and/or an indicator light.

According to another embodiment, a valid range may be set through the remote monitoring program of the window 600 to alert engineers to potential problems with sensors or calculations. For example, a valid range may be set for the $NO_x$ concentration of between 5 and 30 g/kW-hr. When the determined $NO_x$ concentration is above or below the valid range a notification may be transmitted similar to the alarm message. According to one embodiment, the outside-of-valid-range notifications may have a lower priority than the alarm messages. Thus, the outside-of-valid-range notifications may have a less urgent notification system.

Figure 7:
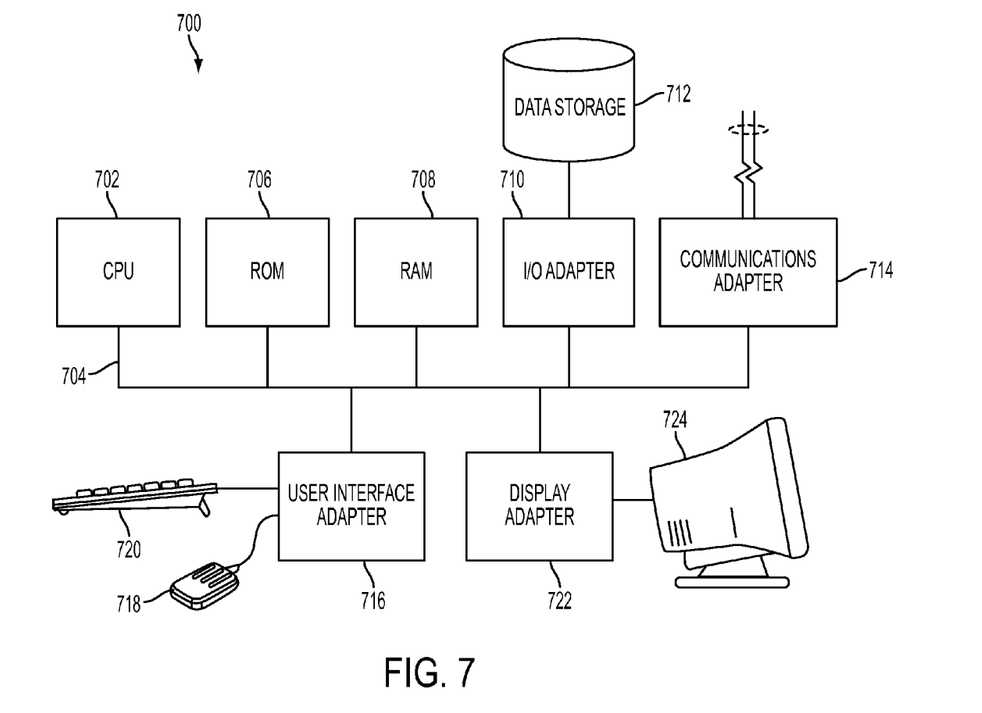
FIG. 7 is a block diagram illustrating a computer system according to one embodiment of the disclosure.

A computer system may be used to display the window 600 of FIG. 6 and receive user input through the window 600. FIG. 7 illustrates a computer system 700. The central processing unit ("CPU") 702 is coupled to the system bus 704. The CPU 702 may be a general purpose CPU or microprocessor, graphics processing unit ("GPU"), and/or microcontroller. The present embodiments are not restricted by the architecture of the CPU 702 so long as the CPU 702, whether directly or indirectly, supports the modules and operations as described herein. The CPU 702 may execute the various logical instructions according to the present embodiments.

The computer system 700 also may include random access memory (RAM) 708, which may be synchronous RAM (SRAM), dynamic RAM (DRAM), and/or synchronous dynamic RAM (SDRAM). The computer system 700 may utilize RAM 708 to store the various data structures used by a software application such as alarm values and valid range values. The computer system 700 may also include read only memory (ROM) 706 which may be PROM, EPROM, EEPROM, or optical storage. The ROM may store configuration information for booting the computer system 700. The RAM 708 and the ROM 706 hold user and system data.

The computer system 700 may also include an input/output (I/O) adapter 710, a communications adapter 714, a user interface adapter 716, and a display adapter 722. The I/O adapter 710 and/or the user interface adapter 716 may, in certain embodiments, enable a user to interact with the computer system 700. In a further embodiment, the display adapter 722 may display a graphical user interface, such as the window 600 of FIG. 6, associated with a software or web-based application on a display device 724, such as a monitor or touch screen.

The I/O adapter 710 may couple one or more storage devices 712, such as one or more of a hard drive, a flash drive, a compact disc (CD) drive, a floppy disk drive, and a tape drive, to the computer system 700. The communications adapter 714 may be adapted to couple the computer system 700 to a network, which may be one or more of a LAN, WAN, and/or the Internet. The communications adapter 714 may be adapted to couple the computer system 700 to a storage device 712. The user interface adapter 716 couples user input devices, such as a keyboard 720, a pointing device 718, and/or a touch screen (not shown) to the computer system 700. The display adapter 722 may be driven by the CPU 702 to control the display on the display device 724.

The applications of the present disclosure are not limited to the architecture of computer system 700. Rather the computer system 700 is provided as an example of one type of computing device that may be adapted to perform the functions of a user interface device. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments.

If implemented in firmware and/or software, the functions described above, such as in FIG. 2 and FIG. 4 may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc, where disks usually reproduce data magnetically, while discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   determining a first load of an engine;
   determining an exhaust flow of the engine for the first load based, at least in part, on an air pressure sensor measurement, an air temperature sensor measurement, and a turbo compressor speed sensor measurement; and
   calculating a first quantity of a chemical emitted from the engine based, in part, on the first load, the exhaust flow, and a density of the chemical.

2. The method of claim 1, further comprising:
   determining a second load of the engine;
   determining a second exhaust flow of the engine for the second load; and
   calculating a second quantity of the chemical emitted from the engine based, in part, on the second load, the second exhaust flow, and the density of the chemical,
   in which the determining of the second load and the determining of the first load are performed at discrete times defined, in part, by a sampling rate.

3. The method of claim 1, in which the step of determining the first load comprises at least one of determining a load from an electrical switchboard, determining a load from an engine shaft, and measuring a load from a generator efficiency.

4. The method of claim 1, in which the step of determining the exhaust flow comprises:
   determining an air flow; and
   determining a fuel flow, wherein determining the exhaust flow is based, at least in part, on the determined air flow and the fuel flow.

5. The method of claim 4, in which the step of determining the air flow comprises determining the air flow based, in part, on a pressure ratio of exhaust of the engine and a rotation rate of a turbo compressor of the engine.

6. The method of claim 5, in which the step of determining the air flow comprises determining the air flow from a compressor map of the turbocharger.

7. The method of claim 4, in which the step of determining the fuel flow comprises looking up a value in a fuel flow table.

8. The method of claim 1, in which the step of calculating a quantity of a chemical comprises calculating a quantity of nitrogen oxide ($NO_x$).

9. The method of claim 1, further comprising generating an alert when the quantity of the chemical exceeds a first value.

10. A computer program product, comprising:
a non-transitory computer-readable medium comprising:
code to determine a first load of an engine;
code to determine an exhaust flow of the engine for the first load based, at least in part, on an air pressure sensor measurement, an air temperature sensor measurement, and a turbo compressor speed sensor measurement; and
code to calculate a quantity of a chemical emitted from the engine based, in part, on the load, the exhaust flow, and a density of the chemical.

11. The computer program product of claim 10, in which the medium further comprises:
code to determine a second load of the engine;
code to determine a second exhaust flow of the engine; and
code to calculate a second quantity of the chemical emitted from the engine based, in part, on the second load, the second exhaust flow, and the density of the chemical,
in which the code to determine the second load and the code to determine the first load are execute at discrete times defined, in part, by a sampling rate.

12. The computer program product of claim 10, in which the code to determine the exhaust flow comprises:
code to determine an air flow; and
code to determine a fuel flow, wherein determining the exhaust flow is based, at least in part, on the determined air flow and the fuel flow.

13. The computer program product of claim 12, in which the code to determine the air flow comprises code to determine the air flow from a compressor map of the engine.

14. The computer program product of claim 10, in which the code to calculate the quantity of the chemical comprises code to calculate a quantity of nitrogen oxide ($NO_x$).

15. An apparatus, comprising:
a power meter coupled to an output of an engine;
an engine monitor coupled to the engine comprising:
an air pressure sensor;
an air temperature sensor; and
a turbo compressor speed sensor;
a memory; and
a processor coupled to the power meter, coupled to the engine monitor, and coupled to the memory,
in which the processor is configured:
to determine a first load of the engine from the power meter;
to determine an exhaust flow of the engine from the engine monitor; and
to calculate a quantity of a chemical emitted from the engine based, in part, on the first load, the exhaust flow, and a density of the chemical.

16. The apparatus of claim 15, in which the processor is configured to calculate a quantity of nitrogen oxide ($NO_x$).

17. The apparatus of claim 15, in which the processor is configured to determine the exhaust flow of the engine based, in part, on an air flow in the engine and a fuel flow in the engine.

18. The apparatus of claim 17, in which the processor is configured:
to receive an air pressure measurement from the air pressure sensor;
to receive a turbo compressor speed from the turbo compressor speed sensor; and
to determine the air flow based, in part, on the air pressure measurement and the turbo compressor speed.

19. The apparatus of claim 18, in which the processor is configured:
to determine the air flow based, in part, on a compressor map for the turbocharger stored in the memory; and
to determine the fuel flow based, in part, on a fuel flow for the engine stored in the memory.

* * * * *